United States Patent [19]
Segal

[11] Patent Number: 5,803,110
[45] Date of Patent: Sep. 8, 1998

[54] FIRE HYDRANT ASSEMBLY

[76] Inventor: Milton Segal, 1919 Chestnut St.-Apt. 1924, Philadelphia, Pa. 19103

[21] Appl. No.: 976,609

[22] Filed: Nov. 24, 1997

[51] Int. Cl.[6] .............................. F16K 17/40; F16K 43/00
[52] U.S. Cl. .................................. 137/68.14; 137/68.15; 137/305; 137/315; 137/797; 251/291
[58] Field of Search .............................. 137/68.11, 68.14, 137/68.15, 68.16, 272, 281, 291, 294, 296, 304, 305, 306, 307, 308, 315, 797; 251/291

[56] References Cited

U.S. PATENT DOCUMENTS

| | | | |
|---|---|---|---|
| 3,586,019 | 6/1971 | Thomas | 137/68.14 |
| 4,284,099 | 8/1981 | Rifat | 137/296 |
| 4,307,746 | 12/1981 | Rifat | 251/291 |
| 4,790,342 | 12/1988 | Segal . | |
| 5,609,179 | 3/1997 | Knapp | 137/68.11 |

*Primary Examiner*—George L. Walton
*Attorney, Agent, or Firm*—Robert Halper

[57] ABSTRACT

An improved fire hydrant having a lower portion and an upper portion. Under normal circumstances the upper portion is simulated fire hydrant made of resilient plastic and connected to the lower hydrant by a special fitting attached to the rim of the hydrant and opened or closed by a key. The special fitting is fastened to a plate projecting upwardly from the lower hydrant. The plate is connected to the lower hydrant through a segmented collar that is secured around a flange of a basket housing. In case of a fire the simulated fire hydrant is replaced by a light weight metal portable hydrant on which the key is suspended, and transported on a fire truck. The portable hydrant has a plurality of dowels that fit into grooves located on an upper extension of the lower fire hydrant.

6 Claims, 2 Drawing Sheets

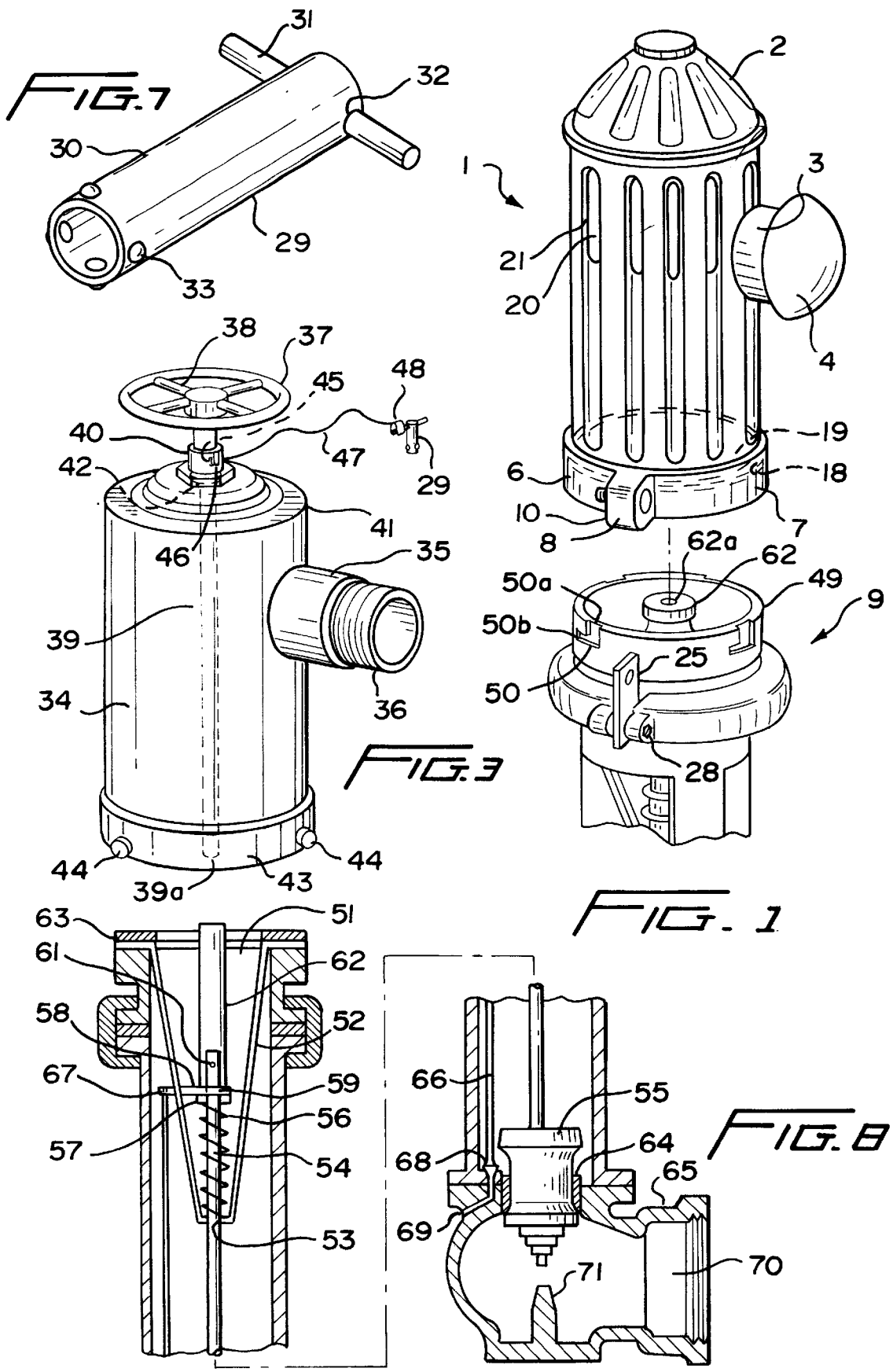

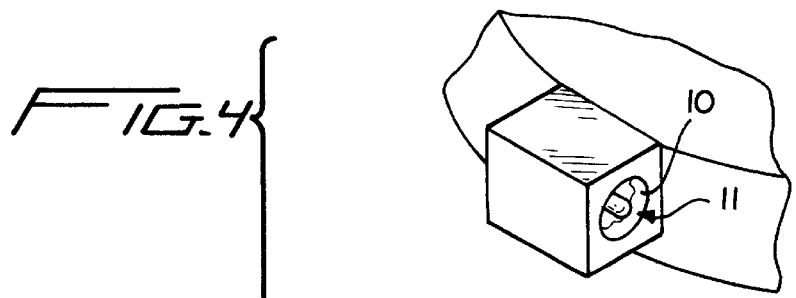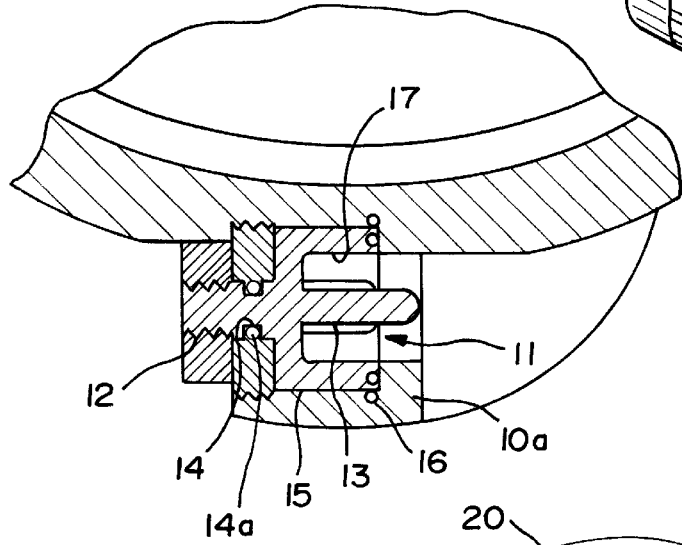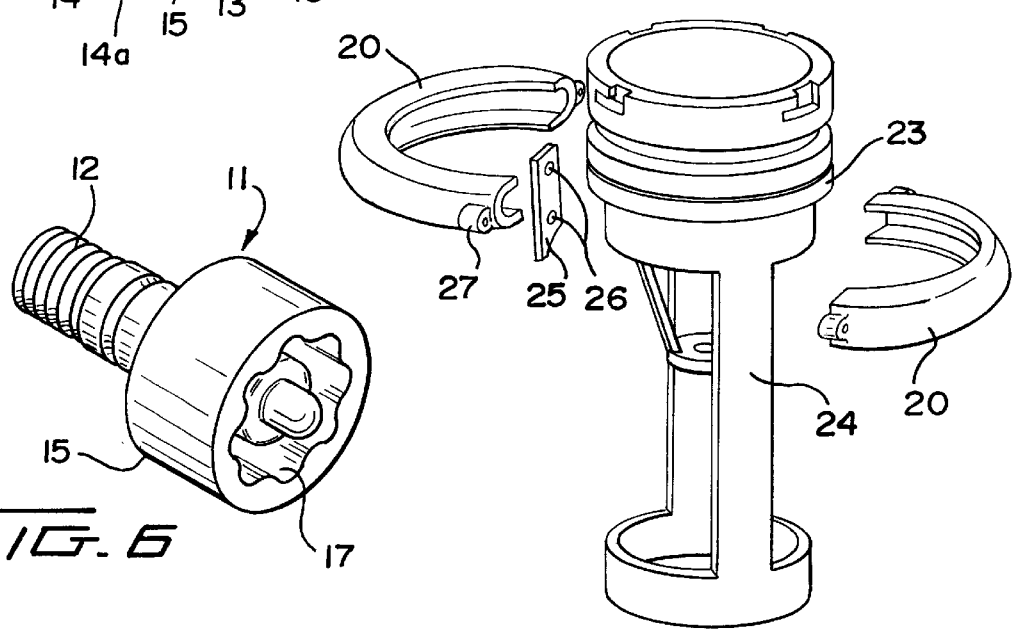

FIRE HYDRANT ASSEMBLY

FIELD OF INVENTION

This invention pertains to fire hydrants and is an improvement of my prior patent, U.S. Pat. No. 4,790,342 which was directed to a valve actuator The novelty involved a specially designed tool to open a valve in the lower portion of the hydrant that was installed in the ground This valve is connected tp a first operating rod. A second operating rod insertable through the upper portion of the fire hydrant engages the first rod The second rod is rotated by a wrench equipped with a specially shaped central opening that fits over the distal end of the rod, As the wrench rotates, the second rod engages the collar of the first rod, causing the first rod to move downwardly agains the force of a compression spring so to displace the valve body from its valve seat. To close the valve an opposite rotation to back off the second rod from the first rod and out of a collar in the upper portion of the hydrant allowing the valve to be seated and preventing further flow of water from an inlet in the lower portion of the fire hydrant.

BACKGROUND OF THE INVENTION

While the apparatus of that invention is successful in minimizing damage to the fire hydrant because of reduction in parts as well as providing a special tool for the inlet valve that denies access to one who would wifully open the same, the fact is that damage to the upper portion of the hydrant can still occur inadvertently from cars or trucks or other types of impact so that even if the locking system ro the valve remains intact, the fire hydrant upper portion needs to be replaced. It is estimated that the city of Philadelphia resets 100 hydrants a month and purchases over 1200 a year.

Accordingly it is an object of this invention to replace the conventional upper portion of the fire hydrant or a fire hydrant as described in my aforementioned patent with a simulated fire hydrant.

It is an additional object of this invention to replace the conventional upper portion of the fire hydrant with a simulated fire hydrant having the same geometry and made of rubber or plastic resilient material.

It is also an object of this invention to provide a to provide a real light weight fire hydrant which will be carried on a fire truck.

It is still an object of this invention to attach a specially designed key to the light weight portable fire hydrant that will be used to unlock the simulated fire hydrant.

It is a further object of this invention to not only avoid damage to the upper portion of the fire hydrants while at the same time making it almost impossible to turn on the water valve without authorization.

SUMMARY OF THE INVENTION

This invention has three new elements such as 1) a simulated fire hydrant upper portion made of rubber or plastic resilient material, 2) a metal rim for the hydrant containing a special fitting and a key that locks the upper portion of the simulated fire hydrant to the lower portion or stand pipe, and a light weight portable hydrant with an operating rod to which is attached the aforesaid key and is transported by the truck to replace the simulated fire hydrant whenever an emergency arises that requires the services of the fire department.

BRIEF DESCRIPTION OF THE DRAWINGS

FIG. 1 is a front view showing the locking assembly for attachment of the simulated fire hydrant upper portion to the lower portion fire hydrant assembly.

FIG. 2 is a perspective view of the lower portion of the fire hydrant with attachments for the portable fire hydrant.

FIG. 3 is a perspective view of the portable fire hydrant.

FIG. 4 is an enlarged view of FIG. 1 showing the locking assembly for attachment to the lower portion of the fire hydrant assembly..

FIG. 5 is a sectional view of the locking assembly taken on line 5—5 of FIG. 4.

FIG. 6 is a perspective view of the locking assembly.

FIG. 7 is a perspective of the key for the locking assembly.

FIG. 8 is a front section showing further details of the lower hydrant portion.

DETAILED DESCRIPTION OF THE INVENTION

FIG. 1 shows a simulated fire hydrant 1 designated as an upper portion and made of a resilient plastic or rubber material. The simulated fire hydrant resembles a real hydrant being cylindrical in shape with a dome like top 2, a simulated outlet 3 on the cylindrical surface with a cap 4. and a metal rim 6 adhesively fastened to the base 7. Integral with the rim is a specially designed fitting 8 for locking the simulated fire hydrant to the lower portion of the fire hydrant assembly 9. The fitting is seated in a cube like housing 10 that extends outwardly from the rim and as best seen in FIG'S. 4 and 5 has a central aperture 10a through which extends a bolt 11 having a threaded portion 12 at one end and a non threaded portion 13 reaching to the other end. Adjacent the threaded portion is a groove 14, fitted with an O-ring 14a. An enlarged head 15 fits snugly in the opening. To hold the head in place in the opening an O- ring 16 is placed around the periphery of the opening Extending through the internal surface of the head and surrounding the bolt are a series of concave indentations 17. In the region of the base of the simulated fire hydrant is a groove 18 in which is mounted a circular steel plate 19. This plate serves to protect the valve located in the lower portion of the hydrant from debris in the event of damage to the simulated fire hydrant. The simulated fire hydrant has a series of spaced longitudinal slots 20 extending around its perimeter. Within each slot below the dome are located a number of fine perforations 21 that serve as air vents in the event the simulated hydrant should be impacted by an automobile or other exterior force. Below the simulated fire hydrant a segmented breaking collar 22 in the form of a U-shaped channel is secured around a circular flange 23 affixed to a basket housing 24 in the lower portion of the hydrant. Between the segments of the collar a rectangular plate 25 having two vertically spaced threaded apertures 26 is placed. The lower aperture is aligned with similar threaded apertures located in cube like housings 27 that extend outwardly from their respective segments. A bolt 28 passing through the respective apertures fastens the collar with the lower portion of the fire hydrant. The upper end of the plate fits adjacent the housing 10 the so that its aperture is in alignment with the threaded end of bolt 11. The plate is attached to the bolt by use of a key 29. The key is constructed as a cylinder 30 having a handle 31 that passes through apertures 32 and is welded to the cylinder. At the other end of the cylinder four spaced bearings 33 are welded around the outer periphery. The bearings are fashioned to engage the concave indentations in the head of the fitting, so that when the key is placed in the housing opening 10 and turned, the bearings engage the indentations in the head, the bolt is rotated and the threaded portion is locked into the plate.This simulated fire hydrant when locked in place, prevents tampering with the hydrant and opening the water valve in the lower hydrant portion, since only the key can unlock the simulated fire hydrant. In the event of a fire and access is required to the water supply, the fire department will carry on its trucks a portable light weight fire hydrant and the key for removal of the simulated fire hydrant.

Portable hydrant 34 is typically a cylinder, made of aluminum or similar light weight metal and includes an outlet 35 with a threaded nozzle 36 at its lateral upper end and a circular wheel 37 having radial spokes 38 welded to a connecting rod 39 that extends through a threaded bushing 40 located in a dome shaped cover 41 of the portable hydrant. The distal end of the connecting rod has a convex surface 39a as will be explained below. An O-ring 42 seals the rod in the bushing. The lower end of the hydrant is enclosed by a ring 43 that extends around the periphery of the hydrant. Attached to the exterior surface of the ring are four equally spaced dowel pins 44. The aforementioned key is affixed to the bushing by a button 45 that slides into a slot 46 in the bushing. At one end a wire line 47 is welded to the button and at the other end the wire is welded to a spring plate 48 that slips over the key handle.The portable hydrant is attached to an upper extension 49 of the aforesaid basket housing 24. The upper extension of the basket has four female connections 50 in the form of elongated grooves having a wider section 50a and a narrower section 50b To attach the portable hydrant to the basket, the portable hydrant is placed over the basket extension so that the dowel pins slip into the wider section of the grooves. The hydrant is then rotated till the pins are locked firmly into the narrow section of the grooves. The lower portion of the hydrant includes generally the elements shown in my prior patent U.S. Pat. 4,790,342 and is hereby incorporated by reference. There are some structural differences, however. For example as seen in FIG. 8, the basket shaped housing has an upper open ended surface 51 and depending struts 52 that are in the form of a cone with an opening 53 at its apex. A first operating rod 54 for controlling the water inlet valve 55 extends through the apex opening and is surrounded by a compression spring 56 to which is fastened an iron washer 57 at its top. The washer and spring are confined at about the intermediate portion of the basket by a cross member 58 and the other end of the spring is supported by the apex.The cross member has an opening 59 through which passes the first operating rod which is connected at its lower end to the valve and at its upper end above the cross member contains a brass pin or set screw 61 which fastens the receiving socket 62 to the first operating rod. The receiving socket passes through an opening in a sealing washer 63 that is placed between the upper extension on the lower portion of the fire hydrant and the ring on the portable fire hydrant. The receiving socket has a recess 62a in its center for receiving the connecting rod 39 as explained below.

After the portable fire hydrant is secured to the lower fire hydrant assembly, the wheel is rotated, causing the connecting rod or second operating rod 39 to pass through the portable hydrant. Rotation continues whereupon the distal end 39a of the connecting rod engages the recess in the receiving socket and subsequently the first operating rod is forced downwardly against the force of the compression spring to move the valve body near the bottom of the lower fire hydrant portion from its seat 64. Water can then enter the lower fire hydrant from an inlet housing 65 fastened to the lower fire hydrant. As the first operating rod moves downwardly, a control rod 66 fastened to an arm 67 of the cross bar and having a lower end 68 also moves downwardly to close drain opening 69 located at the bottom of the lower fire hydrant, The inlet housing 65 has an inlet opening 70 and a valve stop 71 directly below the valve. The incoming water continues upwardly to continue through the outlet in the upper hydrant. When the water supply is no longer needed, the handle is rotated in a reverse direction so as to raise the first operating rod upwardly under the force of the compression spring so as to allow the valve to be in contact with its seat, while the control rod lower end rises to open the drain opening. When this last operation has been completed, the portable fire hydrant is turned in a counter direction, released from the lower fire hydrant assembly and replaced with the simulated fire hydrant locked in place.

The aforementioned described design is an improvement over my prior patent U.S. Pat. No. 4,790,342 since there are fewer parts to be damaged, namely the rubber or plastic housing, much less expensive than metal housing shown therein, the rim and cylindrical plate; however, even if damage were to occur, the simulated fire hydrant could not be opened without the key. It should also be noted that even in a worst case scenario such as the complete shearing of the simulated fire hydrant, the valve in the lower hydrant still requires as in my aforesaid patent, a special tool to move it from its seat.

While a description of the invention has been made in great detail, various modifications, alterations and changes could be made, as would be obvious to one skilled in the art, without departing from the spirit and scope of the invention as defined by the appended claims.

I claim:

1. A fire hydrant comprising a lower fixed hydrant assembly and a variable upper portion and means connecting said upper variable portion to said lower fixed hydrant assembly, said lower fixed hydrant assembly being substantially mounted in the ground and said variable upper portion being above ground, said lower fixed hydrant assmebly including a basket housing having an upper extension and having an upper end and a lower end, a water inlet valve seated in said lower end having means for urging said valve to a normally closed position, said means comprising a first operating rod disposed in said lower hydrant assembly, one end of said rod being engaged with said valve, another end extending to said upper extension, means for supporting said rod for axial movement between a first position when said valve is opened and a second position when said valve is closed, said variable upper portion comprising a simulated fire hydrant of resilient plastic mounted to said lower fixed hydrant assembly under normal conditions and a light weight metal portable fire hydrant mounted to said lower fixed hydrant in the event of a fire, said simulated fire hydrant having a base, a circular rim adhesively attached around said base, a solid circular plate fastened within said rim, said plate extending to an inner periphery of said simulated fire hydrant and sealing said simulated fire hydrant from said lower hydrant assembly, said means for connecting said simulated fire hydrant to said lower fire hydrant assembly including a segmented breaking collar having housings aligned at ends of segments of said collar and extending outwardly therefrom, said housings including threaded openings in said housings, a rectangular plate having a lower and upper spaced threaded aperture, said lower aperture being aligned with said threaded apertures in said housings, a bolt passing through said apertures to fasten said segments of said breaking collar, said circular rim having a housing extending outwardly from said rim, said housing having an opening for a fitting that includes an enlarged head and a bolt integral with said head extending through said opening, said bolt having a threaded section externally of said head and a non-threaded section, a groove for an O-ring adjacent said threaded section, said head having a plurality of concave indentations with an O-ring in said indentations surrounding said non-threaded section of said bolt, said upper threaded aperture of said retangular plate being placed adjacent said housing extending from said rim so as to be in alignment with said threaded section of said bolt, and a key for locking said bolt to said plate.

2. A fire hydrant as in claim 1 wherein said lower fire hydrant assembly a has a lower portion having a flanged upper surface affixed to a basket housing, said segmented collar being fastened around said flanged upper surface.

3. A fire hydrant as in claim 1 where said means for connecting said portable fire hydrant to said lower hydrant assembly includes a rim on a lower end of said hydrant, said rim having a plurality of spaced dowel pins, said basket housing having an upper extension having grooved sections, said grooved sections including a wider section and a narrower section, said portable fire hydrant being placed over said extension so that the dowel pins mesh with the wider section, said portable hydrant being rotated until said dowel pins lock into said narrow section, a seal placed between said rim of said portable hydrant and said upper extension.

4. A fire hydrant as in claim 1 wherein said resilient plastic of said simulated fire hydrant is a rubber material and said light weight metal of said portable hydrant is made of aluminum, said key being carried on said portable hydrant.

5. A fire hydrant as in claim 4 wherein said key is cylindrical with four spaced bearings on the cylinder, said key having a rod extending through apertures in said cylinder, said rod being located at an opposite end from said bearings, said bearings engaging said concave indentations in said head to rotate said bolt when said rod is turned.

6. A fire hydrant as in claim 5 where said key is secured to said portable hydrant by a button that engages a slot on a bushing in a cover of said portable hydrant, said button attached to said key through a flexible wire at one end, another end of said wire having a spring clamp that fastens to a handle of said key, a connecting rod passing through said bushing and having a wheel above said cover for rotating said connecting rod and engaging said first operating rod in said lower fire hydrant assembly when it is necessary to open said water valve.

* * * * *